United States Patent [19]

Hanamura et al.

[11] 3,862,962

[45] Jan. 28, 1975

[54] PROCESS FOR PRODUCING GRANULAR ACTIVE CARBON FROM A MIXTURE OF ASPHALT AND ELEMENTARY SULFUR

[75] Inventors: Tomoaki Hanamura; Ryuzo Ijiri; Masami Mori, all of Chiba-ken, Japan

[73] Assignee: Idemitso Kosan Kabushiki Kaisha, Tokyo-to, Japan

[22] Filed: Apr. 24, 1973

[21] Appl. No.: 354,011

[30] Foreign Application Priority Data

Apr. 25, 1972 Japan.............................. 47-40937

[52] U.S. Cl................ 252/422, 252/445, 423/449
[51] Int. Cl............................................ C01b 31/08
[58] Field of Search.................. 252/422, 421, 445; 423/445, 449

[56] References Cited
UNITED STATES PATENTS

| | | | |
|---|---|---|---|
| 2,234,769 | 3/1941 | McCulloch | 252/422 |
| 2,549,298 | 4/1951 | Donegan | 252/421 |
| 2,585,454 | 2/1952 | Gamson | 252/422 |
| 2,829,115 | 4/1958 | Bushong et al. | 252/422 |
| 3,248,303 | 4/1966 | Doying | 252/422 |

FOREIGN PATENTS OR APPLICATIONS

| | | | |
|---|---|---|---|
| 641,255 | 5/1962 | Canada | 252/422 |
| 1,283,357 | 12/1961 | France | 252/445 |

Primary Examiner—Daniel E. Wyman
Assistant Examiner—P. E. Konopka
Attorney, Agent, or Firm—William J. Daniel

[57] ABSTRACT

A process for producing from a mixture of asphalt and elementary sulfur granular active carbon possessing high mechanical strength, which comprises reacting said mixture under heating to form an infusible hardened product, pulverizing such product into powder, shaping the powder with asphalt as binder into granular form, baking the resulting granules in a stream of an oxygen-containing gas having an oxygen content of at most 20 percent and then activating the granules in a usual manner.

4 Claims, No Drawings

PROCESS FOR PRODUCING GRANULAR ACTIVE CARBON FROM A MIXTURE OF ASPHALT AND ELEMENTARY SULFUR

BACKGROUND OF THE INVENTION

This invention relates to a new process for the production of granular active carbon. More particularly, this invention relates to a process for producing from asphalt and elementary sulfur a high yield of granular active carbon of high quality and high mechanical strength.

It is known that a starting carbon material can be shaped with a variety of binders to granules having a definite size and then heated for activation. For example, U.S. Pat. No. 2,585,454 discloses a process for the production of powdery active carbon which comprises reacting a mixture of asphalt and elementary sulfur under heating to form an infusible hardened product, which is then pulverized and then activated.

Another process is also known for producing granular active carbon, wherein finely divided powder of a weakly coking coal is shaped with a binder, such as pulp waste liquor or pitch emulsion, into granules which are baked or carbonized in a stream of an inert gas and then activated. (Japanese Patent Publn. No. 41210/1971.)

However, when an infusible hardened product obtained by reacting a mixture of asphalt and sulfur under heating is used as a starting material and treated according to the process disclosed in Japanese Patent Publn. No. 41210/1971, a granular active carbon product of a sufficient mechanical strength for practical use cannot be obtained. For this reason, it has not been possible to produce practically useful granular active carbon from an infusible hardened product obtained by reacting a mixture of asphalt and sulfur under heating.

BRIEF SUMMARY OF THE INVENTION

It is an object of this invention to provide granular active carbon possessing high mechanical strength.

It is another object of this invention to provide a process for the production of granular active carbon possessing high mechanical strength from asphalt and sulfur.

It is still another object of this invention to provide a baking method suitable for obtaining granular active carbon possessing high mechanical strength from an infusible hardened product obtained by reacting a mixture of asphalt and sulfur under heating.

Other objects of this invention will become apparent as the description proceeds.

DETAILED DESCRIPTION OF THE INVENTION

As a result of much research for developing a process for the production of improved forms of granular active carbon from the infusible hardened product of U.S. Pat. No. 2,585,454, it has been found unexpectedly that when baking of the granules is carried out in a stream of an oxygen-containing gas in place of an inert gas, granular active carbon of high quality and high mechanical strength can be produced in a high yield.

In accordance with this invention, these objects can be attained by reacting a mixture of asphalt and elementary sulfur under heating to form an infusible hardened product, crushing it to powder, shaping the powder with asphalt as a binder into granular form, baking the resulting granules in a stream of an oxygen-containing gas having an oxygen content of at most 20 percent and then activating the granules in a usual manner.

For obtaining granular active carbon high in mechanical strength and in adsorptivity by the process of this invention, it is necessary to combine the steps of using as starting material powder obtained from the hardened product of the reaction between asphalt and sulfur, shaping this powder with asphalt as binder into granules and baking it in a stream of an oxygen-containing gas. The use of a known conventional binder such as pulp waste liquor or pitch emulsion fails to give granular active carbon possessing desirable properties as herein described.

In practicing this invention, asphalt and sulfur are first mixed and the mixture heated at a temperature of 200°–250°C. The mixture reacts during this heating treatment and evolves hydrogen sulfide. The viscosity of the reaction mixture increases as the reaction proceeds until the product finally assumes a paste-like condition. On further heating the paste-like substance at about 350°C for a definite period of time, the reaction mixture is converted finally into a fusible hardened mass which, in practicing this invention, is crushed into powder to be shaped into granules.

Examples of asphalt utilizable in the process of this invention include straight asphalt, propane decoked asphalt, blown asphalt, etc. These asphaltic materials are not necessarily used alone and may be used optionally in admixture with a heavy petroleum product such as the residuum from the thermal cracking of petroleum. Elementary sulfur is used in the process of this invention preferably in an amount of 66–100 parts by weight per 100 parts by weight of asphalt.

The hardened reaction product of asphalt and sulfur is crushed to such a degree that the resulting powdery material may easily be shaped into granules, for example, powders of about 100 mesh in particle diameter.

In the practice of this invention, the crushed powdery material is shaped into granules together with one of the above-mentioned asphaltic materials as binder. For this purpose, the asphaltic binder is used preferably in an amount of 5–30 parts by weight for 100 parts by weight of the crushed powder. If the amount of binder is less than 5 percent by weight, the binding effect will be small and make more difficult the shaping of the powdery material into granules, thus resulting in reduction of the strength of the ultimate active carbon granules. On the other hand, if the amount of binder exceeds 30 percent by weight, undesirable results will follow in that the granules will tend to adhere mutually by fusion during the step of baking. The shaping step itself may be performed by any of the desirable methods conventionally adopted for manufacturing granules from powdery materials, for example, by compression molding, rolling, pellitization, etc.

The resulting granules are then baked in a stream of an oxygen-containing gas having an oxygen content of at most 20 percent, preferably 4–10 percent, whereby the asphaltic binder material is reacted with oxygen to form a solvent-insoluble hardened product. The content of oxygen in the stream is maintained at 20 percent or less during the baking treatment. If the content of oxygen exceeds 20 percent, the granular material will be incinerated to permit local elevation of temperature. When incineration tends to occur at a given baking temperature even at an oxygen content of less than 20 percent, then the flow rate of the stream should be controlled adequately. The baking temperature is preferably maintained at 400°C or lower. If the temperature becomes higher than 400°C, incineration of the granules will take place even at an oxygen content as low as 4 percent. It is desirable to keep the baking temperature at a temperature of at least 260°C, considering the rate of reaction between the asphaltic material and oxygen.

The baked product thus obtained is then activated in the usual way be heating the product at a high temperature in the presence of carbon dioxide or steam.

The granular active carbon obtained according to the process of this invention possesses distinctly enhanced mechanical strength and abrasion-resistance, unlike similar products obtained according to prior art processes. In addition, the product of this invention possesses good adsorptivity. The process of this invention is economically advantageous since the product can be obtained in good yield from starting materials commercially available at low prices, i.e., asphaltic material and sulfur.

PREFERRED EMBODIMENT OF THE INVENTION

This invention will be explained in more detail by way of the following example.

EXAMPLE

To 800 g of straight asphalt (residual oil obtained by distillation under reduced pressure of crude oil produced by Kuwait; sp. gr. 1.020; penetration 210; softening point 39°C; flash point 346°C; sulfur content 5.3 percent by weight) were added 800 g of granular sulfur (purity 99.9 percent or higher). The mixture was slowly heated to about 120°C to melt the sulfur. The mixture was stirred until it became liquid and further heated to elevate the temperature with continuous stirring. The liquid mixture gradually changed to a highly viscous liquid while evolving hydrogen sulfide at a temperature of about 210°C. The mixture was then heated for one hour at about 240°C whereupon the mixture lost its fluidity and took on a paste-like condition. Stirring was stopped at this stage and the temperature of the material was further elevated and kept at about 350°C for 1 hour to obtain a porous black hardened mass.

This operation was repeated several times to obtain a total of about 5 kg. of the hardened product which was then crushed into powder of 100 mesh in size. An average yield of the powder is 110 percent by weight based on the starting asphalt.

Next, the powder was mixed with a given amount of a specified asphalt binder (i.e., either straight asphalt as characterized above or propane decoked asphalt with sp. gr. 1.063, penetration 7, softening point 68°C, flash point 364°C and sulfur content 6.3 percent by weight) and the mixture was made into granules by both compression molding and rolling. Mixing of the powdery material with the binder was carried out by adding the binder melted by heating to about 20°C above its softening point, to the powdery material which had been preheated to about the same temperature, and resulting mixture was thoroughly mixed as to obtain a wet mixture. Granulation by compression molding was effected by cooling the mixture and pelletizing it by means of a pelletizer to form cylindrical pellets of 5 mm each in diameter and height. Granulation by rolling was effected by extruding the mixture by means of a compression extruder in pellet form and shaping the pellets into spheres of about 3 mm in diameter by means of a sphere-making machine heated with warm water.

300 Grams of the granules thus prepared were charged into a stainless steel rotary electric furnace where the granules were gradually heated in alternate batches with nitrogen or a nitrogen/air mixture introduced at a flow rate of 5 liters per minute. The heating rate was such as to elevate the temperature 3°C per minute from 200°C. After the temperature reached 400°C, the granules were maintained at this temperature for 30 minutes to effect baking. The baked granules were weighed after cooling and charged again into the same furnace where they were heated up to 860°C while introducing steam. Heating was continued at this temperature for one hour to effect activation.

The granular active carbon thus obtained was tested to evaluate its adsorptivity (in terms of Methylene Blue decolorizing powder and benzene adsorbing power) and its mechanical strength (in terms of hardness). The Methylene Blue decolorizing power was measured using crushed pieces of the granular active carbon according to JIS K 1470, while the benzene adsorbing power was measured using the granular active carbon itself according to JIS K 1412. The hardness was measured according to JIS K 1412.

The results of these tests and the yields of granular active carbon are tabulated below with relation to the sorts and amounts of binders, methods of granulation and baking conditions.

| Binder | Decoked Asphalt | | Straight Asphalt | | Decoked Asphalt | | Straight Asphalt | |
|---|---|---|---|---|---|---|---|---|
| Amount[1] | 20 | | 20 | | 25 | | 25 | |
| Method of Granulation | Compression Molding | | Compression Molding | | Rolling | | Rolling | |
| Baking Atmosphere | N$_2$/air | N$_2$ | N$_2$/air | N$_2$ | N$_2$/air | N$_2$ | N$_2$/air | N$_2$ |
| O$_2$ Content (%) | 4 | 0 | 4 | 0 | 4 | 0 | 4 | 0 |
| Yield of Baked Product | 83.9 | 78.7 | 83.3 | 77.1 | 76.5 | 70.6 | 75.8 | 70.9 |
| Yield of Active Carbon (%)[2] | 28.7 | 25.6 | 28.0 | 25.6 | 26.2 | 24.0 | 25.1 | 23.3 |
| Decolorizing Power (ml) | 150 | 140 | 150 | 150 | 160 | 150 | 160 | 150 |
| Adsorbing Power (%) | 45.9 | 44.8 | 46.0 | 44.8 | 44.1 | 43.0 | 42.4 | 41.5 |
| Hardness (%) | 77.9 | 8.2 | 84.2 | 4.1 | 93.6 | 5.2 | 92.6 | 6.1 |

[1] Parts by weight for 100 parts by weight of powder
[2] Percent by weight based on the starting asphalt

What is claimed is:

1. A process for producing granular active carbon from a mixture of an asphaltic material and elementary sulfur, comprising the steps of reacting said mixture by heating at a temperature sufficient to fuse the mixture up to about 350°C for a time sufficient to form an infusible hardened product, crushing such product into powder, shaping the powder with a binding amount of an asphaltic binder into granules, baking without incinerating the granules in an atmosphere containing from about 4-20 percent of oxygen, whereby said binder is reacted with oxygen to form a solvent insoluble hardened product, and then subjecting the granules to a high temperature activating treatment in the presence of carbon dioxide or steam said mixture comprising 100 parts by weight of an asphaltic material and 66-100 parts by weight of elementary sulfur, and the binding amount of the asphaltic binder being within the range of 5-30 parts by weight per 100 parts by weight of crushed powder.

2. A process according to claim 1 wherein said baking temperature is within the range of about 260°-400°C.

3. A process according to claim 1 wherein said oxygen-containing gas has an oxygen content of about 4-10 percent.

4. Products obtained by the process of claim 1.

* * * * *